No. 885,980. PATENTED APR. 28, 1908.
W. J. CROSSLEY & T. RIGBY.
PROCESS OF RECOVERING AMMONIA AND HEATING AIR
IN THE MANUFACTURE OF PRODUCER GAS.
APPLICATION FILED AUG. 30, 1907.
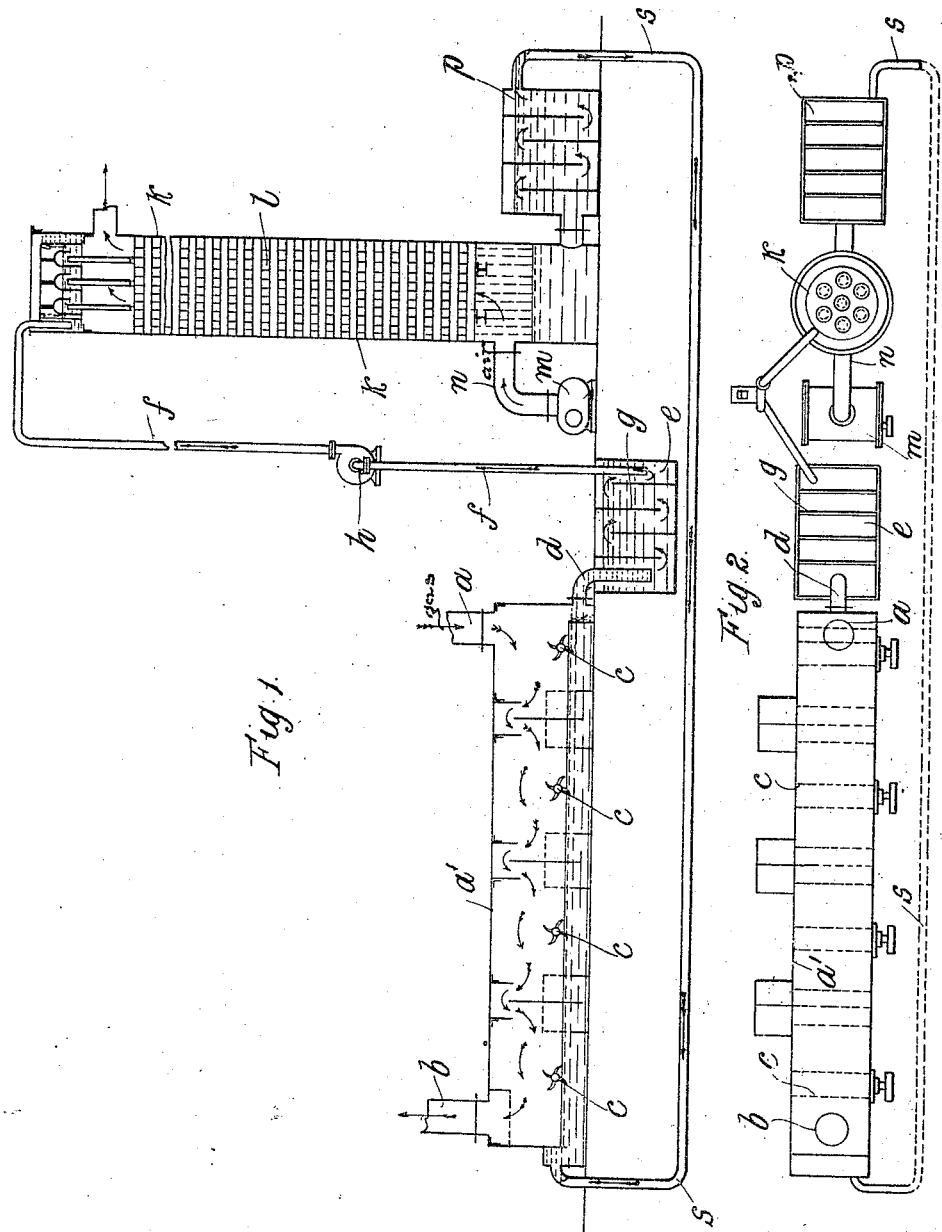

UNITED STATES PATENT OFFICE.

WILLIAM JOHN CROSSLEY AND THOMAS RIGBY, OF OPENSHAW, NEAR MANCHESTER, ENGLAND.

PROCESS OF RECOVERING AMMONIA AND HEATING AIR IN THE MANUFACTURE OF PRODUCER-GAS.

No. 885,980.      Specification of Letters Patent.      Patented April 28, 1908.

Application filed August 30, 1907. Serial No. 390,833.

*To all whom it may concern:*

Be it known that we, WILLIAM JOHN CROSSLEY and THOMAS RIGBY, both subjects of Great Britain, residing at Openshaw, near Manchester, in the county of Lancaster, England, have invented new and useful Improvements in Processes of Recovering Ammonia and Heating Air in the Manufacture of Producer-Gas, of which the following is a specification.

This invention has for its object improvements in the process of recovering ammonia and heating air in the manufacture of producer gas. In such a process in order to obtain a large yield of ammonia it is desirable to work the producers at a low temperature and this is usually done by arranging for a large quantity of steam to be mixed with the air passing through the gas producer. A portion of the excess of steam passes through the producer undecomposed and to make the process an economic success it is not only necessary to recover the ammonia but it is essential that the great quantity of latent heat present in the water vapor should be recovered from the gas. In most of the processes employed the ammonia is recovered at a temperature above that at which the water vapor is condensed and before it is condensed, but in the British patent granted to the said Thomas Rigby and numbered 20716 of 1901 a process is described in the specification which was calculated to simplify methods hitherto in use by condensing the water vapor and tars in the gas before the ammonia was absorbed and this was done in a special way as described in the aforesaid patent. By means of this improved process the plant was considerably simplified and the process made easier to work.

The object of the present invention is to still further simplify the process and instead of recovering the latent heat of the water vapor separately and the ammonia separately we combine the operations.

In the aforesaid process an apparatus was used mentioned in that specification as a washer. This washer was of improved construction and was split up into compartments, with the object of making zones of temperature the water contained in the washer traveling constantly in the direction of the hottest end. This hot water was then pumped through an air saturating tower, with the object of saturating the air supply to the producers with water vapor and cooling the water, the cool water flowing back to the coolest end of the washer and then re-circulated. This apparatus was also arranged in such a manner that the ammonia was not lost being passed onwards with the gases to an ammonia absorbing tower.

In the present invention we add sulfuric acid to the water circulating in the washer in such quantities that there is always present in the liquor a small quantity of free acid and thus a fairly concentrated solution of sulfate of ammonia is obtained and circulated instead of water. The actual sulfate liquor thus becomes the medium for inter-changing the heat of the gas and the water vapor condensed and also washes the gas, the small percentage of free acid present in the liquor absorbing the ammonia in the gas in a very efficient manner.

It will be understood that the water vapor from the gas condensed by the liquor in the washer is added to this liquor and is more or less afterwards recovered in the air saturating tower, portions of the liquor being taken off as required for further concentration by evaporation and crystallization in the usual manner.

In the accompanying sheet of drawings— Figure 1 is an elevation of the general arrangement of apparatus constructed according to our invention and Fig. 2 is a plan view of Fig. 1.

The apparatus shown in the drawings is that which we prefer to use but we wish it to be understood that we do not limit our claims to this particular form or arrangement of apparatus, as it is obvious that the principles of the invention may be applied in a great many different ways. Also we may use any other kind of apparatus instead of, or in addition to, the washer and the air saturating tower previously referred to so long as the same body of liquor circulates through them, cooling the gas, washing it, condensing its water vapor and absorbing its ammonia during one part of its circuit and heating and saturating the air supplied to the producer during the other part of its circuit.

In operation, the gas after leaving the gas producers and air superheating apparatus, enters the washer at *a* and, passing into the first compartment, meets the spray raised by the paddle in this compartment and as it passes on, as shown by the arrows, into each successive compartment, it meets the spray raised by the paddles in each compartment finally leaving the washer at $b$. The temperature in each compartment varies the liquor flowing along the bottom of the washer in the opposite direction to the gas. The heated liquor leaves the washer by means of the sealed pipe $d$ and enters the hot well $e$ suitably arranged with baffles $g$.

The pump $h$ is arranged to pump the liquor up a pipe $f$, from the hot well to the top of an air saturating tower $k$ from whence it is distributed uniformly down checker work $l$ with which the tower is packed. Air from the blower $m$ enters the air tower at $n$ and is blown through the checker work in the opposite direction to the down coming circulating liquor and leaves the top of the air saturating tower $k$ saturated with water vapor. The circulating sulfate liquor leaves the foot of the air saturating tower considerably lower in temperature and passes into the baffle box $p$ from whence it flows by gravity along the pipe $s$ back to the cool end of the washer to be again circulated and so on continuously.

It will be seen that the extent and cost of the apparatus required under our system is considerably reduced as an ammonia absorbing chamber or acid tower and gas cooling tower with their pumps and complicated connections as commonly used are dispensed with and only one set of pumps, one washer and one air saturating tower are necessary.

We find in practice that any ammonia contained in the tar or other impurities brought down in the washer is absorbed by the sulfate liquor so that practically all the ammonia contained in the gas is recovered and converted into sulfate of ammonia; a greater yield of ammonia per ton of fuel can thus be obtained. Any difficulties which might have been expected owing to dust and tar in the liquor have been obviated by using liquor containing only small traces of sulfuric acid and we find that there is no difficulty in separating dust and tar from such liquor.

When considerable quantities of dust are present in the gas or when they are at such a high temperature that they would melt lead it may be advantageous to treat the gas with water previous to its entrance to the condensing and absorbing apparatus and it is obvious that such details may be added if found desirable without sacrificing the principles of the invention.

As there is no need to keep in the sulfate liquor a greater proportion than the half of one per cent. of free sulfuric acid we are able to use cast iron freely in the construction of the apparatus in place of the usual lead lining, the wear and tear of materials with such dilute liquors being considerably reduced.

We declare that what we claim and desire to secure by Letters Patent of the United States is:—

1. The process of recovering ammonia and heating air in the manufacture of producer gas which consists in circulating continuously sulfate liquor and bringing producer gas in contact therewith so as to absorb the ammonia, cool and wash the gas, condense the water vapor and simultaneously heat and saturate the air supplied to the producers with said sulfate liquor, substantially as and for the purposes herein described.

2. The process of recovering ammonia and heating air in the manufacture of producer gas which consists essentially in combining in one operation and by the use of sulfate liquor as the regenerative or heat interchanging medium, the recovery of the latent heat from the gas and the heating and saturation with water vapor of the air on its way to the generator.

In testimony whereof we have signed our names to this specification in the presence of two subscribing witnesses.

WILLIAM JOHN CROSSLEY.
THOMAS RIGBY.

Witnesses:
JOSEPH JONES,
ROBERT HARRISON.